(12) United States Patent
Kim et al.

(10) Patent No.: US 8,762,844 B2
(45) Date of Patent: Jun. 24, 2014

(54) IMAGE DISPLAY APPARATUS AND METHOD OF CONTROLLING THE SAME VIA PROGRESS BARS

(75) Inventors: Sin-Ae Kim, Suwon-si (KR); Hyun-Mi Park, Suwon-si (KR); Deok-Hee Jeong, Seongnam-si (KR); Joo-Kyung Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 12/258,146

(22) Filed: Oct. 24, 2008

(65) Prior Publication Data

US 2009/0116817 A1 May 7, 2009

(30) Foreign Application Priority Data

Nov. 5, 2007 (KR) .................. 10-2007-0112107

(51) Int. Cl.
*G06F 3/00* (2006.01)
*G06F 3/033* (2013.01)

(52) U.S. Cl.
USPC .......................... 715/716; 715/833

(58) Field of Classification Search
USPC ............. 715/204, 723, 716–719, 833, 974; 345/473, 619; 386/95
See application file for complete search history.

(56) References Cited

U.S. PATENT DOCUMENTS

| | | | |
|---|---|---|---|
| 5,596,705 A * | 1/1997 | Reimer et al. ............. 715/720 |
| 5,838,938 A * | 11/1998 | Morgan ..................... 715/723 |
| 6,268,854 B1 * | 7/2001 | Borden et al. ............ 715/786 |
| 6,847,778 B1 * | 1/2005 | Vallone et al. ............ 386/344 |
| 6,904,228 B2 * | 6/2005 | Nishimura et al. ........ 386/241 |
| 7,231,135 B2 * | 6/2007 | Esenyan et al. ........... 386/241 |
| 7,434,155 B2 * | 10/2008 | Lee .......................... 715/203 |
| 7,458,025 B2 * | 11/2008 | Crow et al. ............... 715/723 |
| 2002/0180774 A1 * | 12/2002 | Errico et al. .............. 345/721 |
| 2004/0027393 A1 * | 2/2004 | Kato et al. ................ 345/838 |
| 2005/0031303 A1 * | 2/2005 | Park ......................... 386/69 |
| 2005/0069283 A1 * | 3/2005 | Mitsuyu .................... 386/46 |
| 2005/0097135 A1 * | 5/2005 | Epperson et al. ........ 707/104.1 |

(Continued)

FOREIGN PATENT DOCUMENTS

| | | | |
|---|---|---|---|
| CN | 1968389 A | 5/2007 |
| JP | 11066083 A | 3/1999 |

(Continued)

OTHER PUBLICATIONS

IEEE 100, The Authoritative Dictionary of IEEE Standards Terms, 7th edition, copyright 2000 by The Institute of Electrical and Electronics Engineers. ISBN 0-7381-2601-2. pp. 168-169 (circuit), 725-726 (network), 751 (node), 824 (physical circuit), and 1162-1163 (terminal).*

(Continued)

*Primary Examiner* — Steven Sax
*Assistant Examiner* — Wilson Varga
(74) *Attorney, Agent, or Firm* — Sughrue Mion, PLLC (57) ABSTRACT

According to an aspect of the present invention, there is provided an image display apparatus including: a selecting unit receiving instructions for selecting progress bars; a storage unit storing information on the progress bars including marks for helping a user to search predetermined scenes of content; and a control unit extracting a scene corresponding to the mark of the selected progress bar from the storage unit, and displaying the extracted scene.

14 Claims, 10 Drawing Sheets

(56) References Cited

U.S. PATENT DOCUMENTS

| | | | |
|---|---|---|---|
| 2006/0048184 A1* | 3/2006 | Poslinski et al. | 725/45 |
| 2006/0120690 A1* | 6/2006 | Park | 386/95 |
| 2007/0014534 A1* | 1/2007 | Kim | 386/83 |
| 2008/0016089 A1* | 1/2008 | Nishiyama | 707/100 |
| 2008/0104534 A1* | 5/2008 | Park et al. | 715/772 |

FOREIGN PATENT DOCUMENTS

| | | |
|---|---|---|
| JP | 2003-37796 A | 2/2003 |
| JP | 2004-072132 A | 3/2004 |
| JP | 2005-101994 A | 4/2005 |
| JP | 2005-236527 A | 9/2005 |
| JP | 2005-328329 A | 11/2005 |
| JP | 2007-142785 A | 6/2007 |
| JP | 2008-301070 A | 12/2008 |
| KR | 1020040071453 A | 8/2004 |
| KR | 10-2004-0096693 A | 11/2004 |
| KR | 10-2005-0046449 A | 5/2005 |
| KR | 10-2006-0063239 A | 6/2006 |
| KR | 1020070010387 A | 1/2007 |

OTHER PUBLICATIONS

Communication (Extended European Search Report) issued Oct. 28, 2010, in counterpart European Application No. 08847653.6.

Office Action issued Mar. 27, 2012 by the State Intellectual Property Office of the People's Republic of China in counterpart Chinese Application No. 200880114753.8.

Communication, dated Apr. 16, 2013, issued by the Japanese Patent Office in counterpart Japanese Patent Application No. 2010-531964.

* cited by examiner

IMAGE DISPLAY APPARATUS AND METHOD OF CONTROLLING THE SAME VIA PROGRESS BARS

CROSS REFERENCE TO RELATED APPLICATION

This application claims priority from Korean Patent Application No. 10-2007-0112107 filed on Nov. 5, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to enabling a user to easily and conveniently search scenes of multimedia content.

2. Description of the Related Art

With the development of TV technology and techniques for transmitting broadcast signals in recent years, digital TVs using a digital transmission technique have attracted attention.

Such digital TV recording function and reproducing function technology enables a user to store a TV program in real time using a personal video recorder (PVR) while the user watches TV, and to reproduce the stored TV program at any time.

Figure 1:
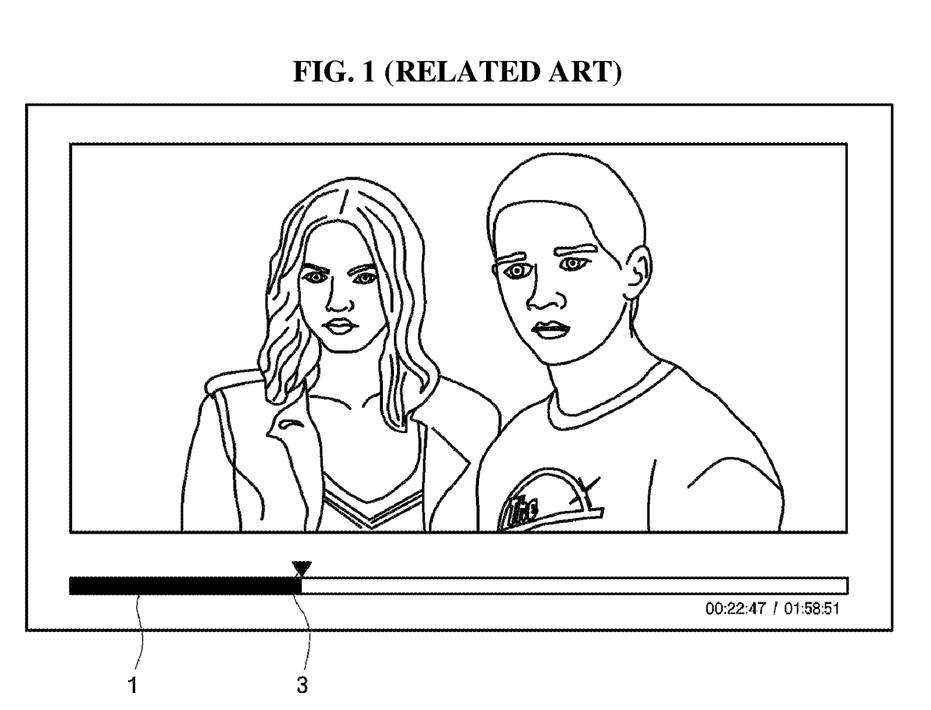
FIG. 1 is a diagram illustrating a scene reproduced on a screen of an image display apparatus according to the related art.

FIG. 1 is a diagram illustrating a scene reproduced on a screen of an image display apparatus according to the related art.

As shown in FIG. 1, the image display apparatus according to the related art reproduces content, and displays a progress bar corresponding to the content below the screen.

However, the progress bar of the image display apparatus in the related art shows only the progress time and positional information of the content being currently reproduced. Therefore, when the user wants to search the content for desired scenes of highlights, a rapid scene change, and scenes bookmarked by the user, the user needs to move a cursor on the progress bar to search a desired scene. As a result, it is difficult for the user to easily and conveniently search for desired scenes.

SUMMARY OF THE INVENTION

The present invention provides an image display apparatus and a method of controlling the same capable of enabling a user to easily and conveniently search desired scenes of content.

According to an aspect of the present invention, there is provided an image display apparatus including: a selecting unit receiving instructions for selecting progress bars; a storage unit storing information on the progress bars including marks for helping a user to search predetermined scenes of content; and a control unit extracting a scene corresponding to the mark of the selected progress bar from the storage unit, and displaying the extracted scene.

According to another aspect of the present invention, there is provided a method of controlling an image display apparatus, the method including: allowing a user to select a desired progress bar; displaying marks for helping the user search predetermined scenes of content on the selected progress bar; moving a cursor to the mark on the selected process bar; and when the user pushes a play button with the cursor positioned at the mark, reproducing the content from a scene corresponding to the mark.

Details of exemplary embodiments are included in the Detailed Description of the Exemplary Embodiments and the accompanying drawings.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF THE EXEMPLARY EMBODIMENTS

Hereinafter, an image display apparatus and a method of controlling the same according to exemplary embodiments of the invention will be described in detail with reference to the accompanying drawings. For reference, in the following description of the present invention, the detailed description of known functions and configurations incorporated herein is omitted for the sake of clarity and conciseness.

Figure 2:
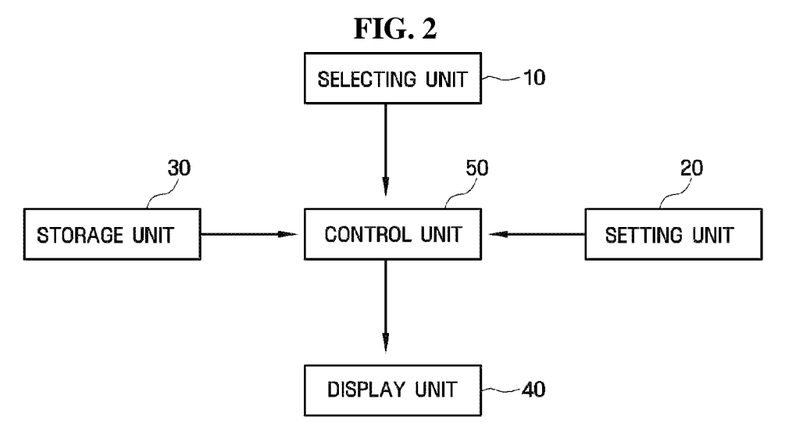
FIG. 2 is a block diagram illustrating the structure of an image display apparatus according to an exemplary embodiment of the invention.
Figure 3:
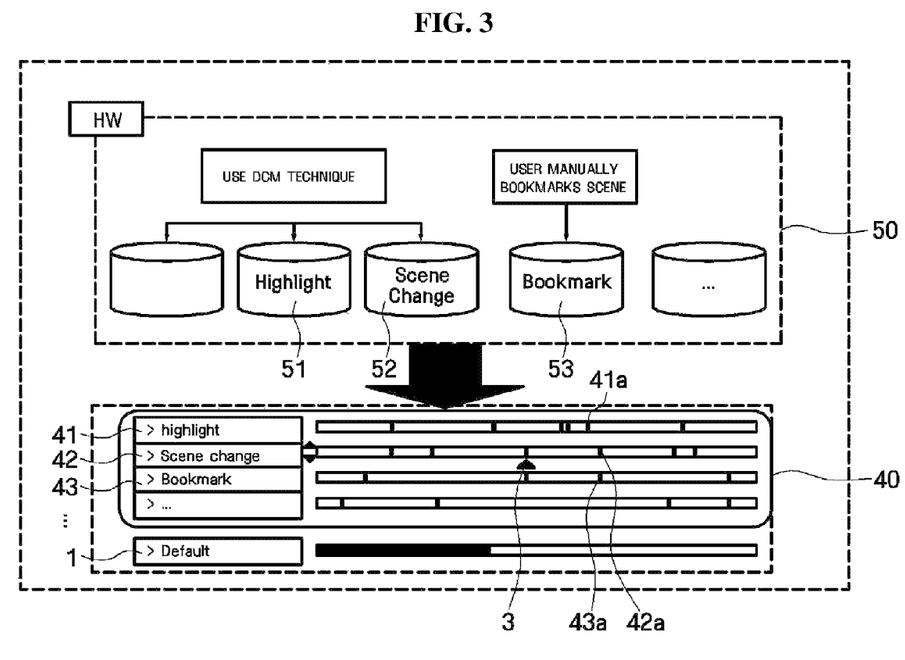
FIG. 3 is a diagram illustrating various progress bars provided in the image display apparatus according to an exemplary embodiment of the invention.

FIG. 2 is a block diagram illustrating the structure of an image display apparatus according to an exemplary embodiment of the invention, and FIG. 3 is a diagram illustrating various progress bars provided in the image display apparatus according to the exemplary embodiment.

As shown in FIGS. 2 and 3, the image display apparatus according to the exemplary embodiment includes a selecting unit 10, a setting unit 20, a storage unit 30, a display unit 40, and a control unit 50.

The selecting unit 10 is used by a user to select progress bars 1, 41, 42, and 43. The current invention is not limited to these progress bars. Progress bars 1, 41, 42, and 43 are merely representative of those displayed in an exemplary embodiment. There may be additional progress bars between the progress bars 1 and 43, as shown in FIG. 3. The selecting unit 10 may be provided in a main body (not shown) of the image display apparatus, or it may be separately provided in a remote controller (not shown) from the main body. In an exemplary embodiment, the selecting unit 10 is up, down, left, and right arrow keys of the remote controller when the image display apparatus is a TV or a PVR. The selection unit 10 is navigation keys or keyboard arrow keys when the image display apparatus is a PMP or a PC.

The setting unit 20 is used to add various progress bars or remove the set progress bars at the request of the user.

The storage unit 30 stores information on content and the progress bars 1, 41, 42, and 43, and includes, for example, storage media, such as a hard disk and a flash memory.

The progress bars 1, 41, 42, and 43, notify the user of the progress time and the positional information of content, and include marks for searching predetermined scenes.

The progress bars 1, 41, 42, and 43 include a default progress bar 1 that indicates the progress time and the positional information of content being currently reproduced. The first progress bar 41 includes a mark 41a for a highlight of the content. The second progress bar 42 includes a mark 42a for a rapid scene change. And the third progress bar 43 includes a mark 43a for the scene bookmarked by the user. In this exemplary embodiment, a general device control module (DCM) technique is used to make the marks 41a and 42a indicating the highlight and the rapid scene change on the first and second progress bars 41 and 42, respectively. The user can manually make the mark 43a on the progress bar 43 in order to indicate the bookmarked scene. The DCM technique and the bookmark technique are known in the related art, and thus a detailed description thereof will be omitted.

The marks 41a, 42a, and 43a, are used to help the user search predetermined scenes, which may include but are not limited to highlights, rapid scene changes, and scenes bookmarked by the user. The positions of the marks 41a, 42a, and 43a, depend on the kinds of progress bars 41, 42, and 43. In addition, the marks 41a, 42a, and 43a are arranged at predetermined intervals on the progress bars 41, 42, and 43.

In an exemplary embodiment, the kinds, shapes, and operation methods of the progress bars 41, 42, and 43, depend on characteristics of image display apparatuses.

In an exemplary embodiment, the image display apparatus is provided with the progress bars 41, 42, and 43, but the invention is not limited thereto. Various kinds of progress bars 41, 42, and 43 may be provided at the request of the user.

The display unit 40 displays content and the progress bars 41, 42, and 43, selected by the selecting unit 10 according to instructions from the user on the screen to be viewed by the user. It is preferable that the display unit 40 display the selected progress bars below the screen on which the content is reproduced.

The control unit 50 recognizes the progress bars 41, 42, and 43, selected by the selecting unit 10, extracts scenes corresponding to the marks 41a, 42a, and 43a, of the selected progress bars 41, 42, and 43, from the storage unit 30, and controls the display unit 40 to display the scenes.

Specifically, when the user selects the first progress bar 41, the control unit 50 displays the mark 41a indicating the highlight of the content on the first progress bar 41, extracts a highlight corresponding to the mark 41a from the storage unit 30, and controls the display unit to display the highlight. In addition, when the second progress bar 42 is selected, the control unit 50 displays the mark 42a indicating a rapid scene change on the second progress bar 42, extracts the scene corresponding to the mark 42a from the storage unit 50, and controls the display unit to display the scene. Further, when the third progress bar 43 is selected, the control unit 50 displays the mark 43a indicating a bookmarked scene on the third progress bar 43, extracts the bookmarked scene corresponding to the mark 43a from the storage unit 30, and controls the display unit to display the scene.

The control unit 50 includes a first controller 51 that controls the operation of the first progress bar 41, a second controller 52 that controls the operation of the second progress bar 42, and a third controller 53 that controls the operation of the third progress bar 43.

When a cursor 3 moving on the selected progress bars 41, 42, and 43, is disposed at the marks 41a, 42a, and 43a, the control unit 50 controls the display unit to display the scenes corresponding to the marks 41a, 42a, and 43a, as thumbnails.

A method of controlling the image display apparatus according to an exemplary embodiment of the invention will be described in detail with reference to FIGS. 4 to 10.

Figure 8:
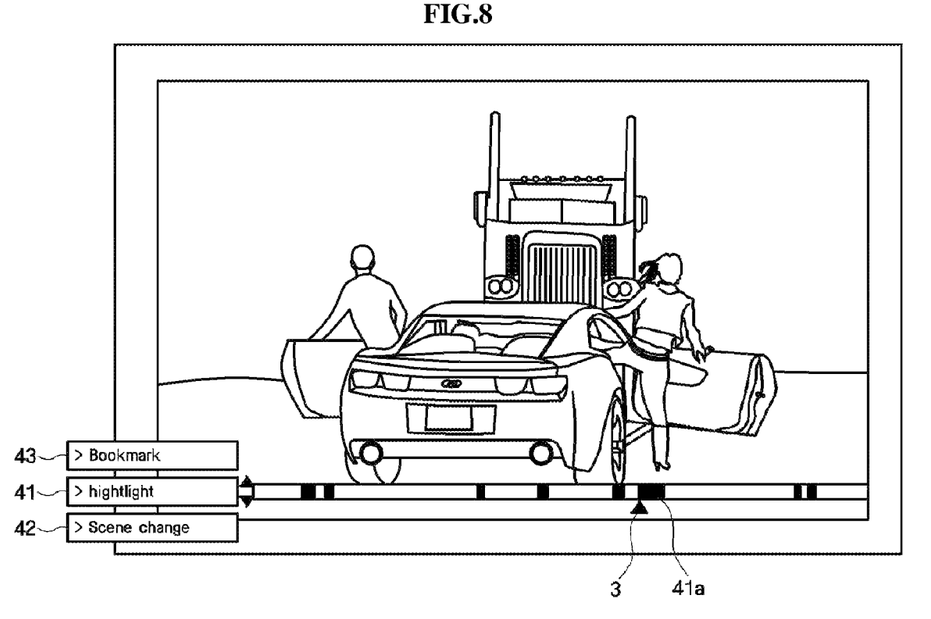
Figure 9:
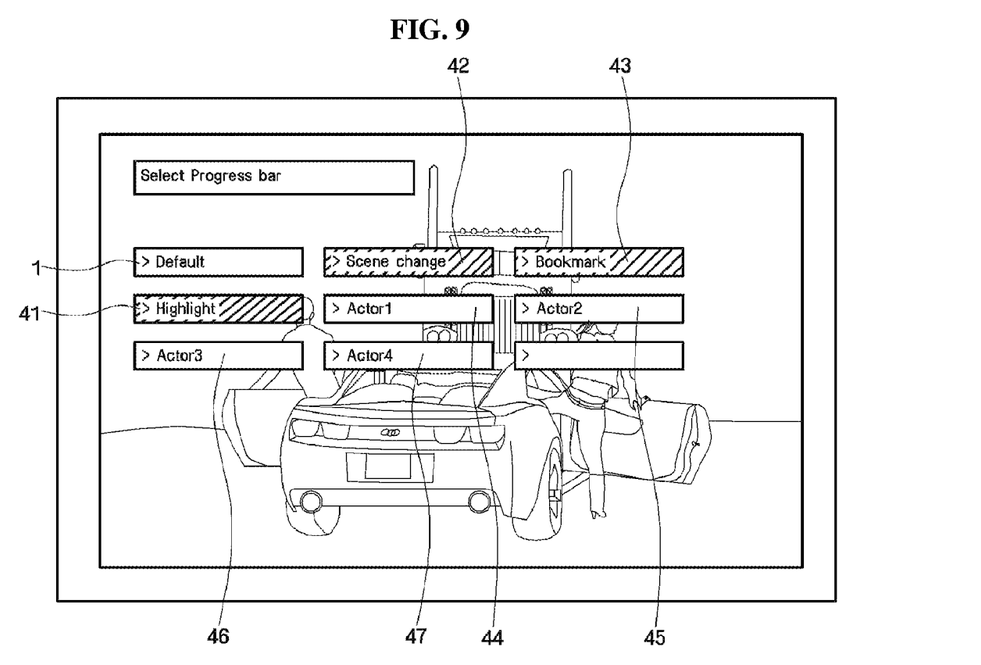
Figure 10:
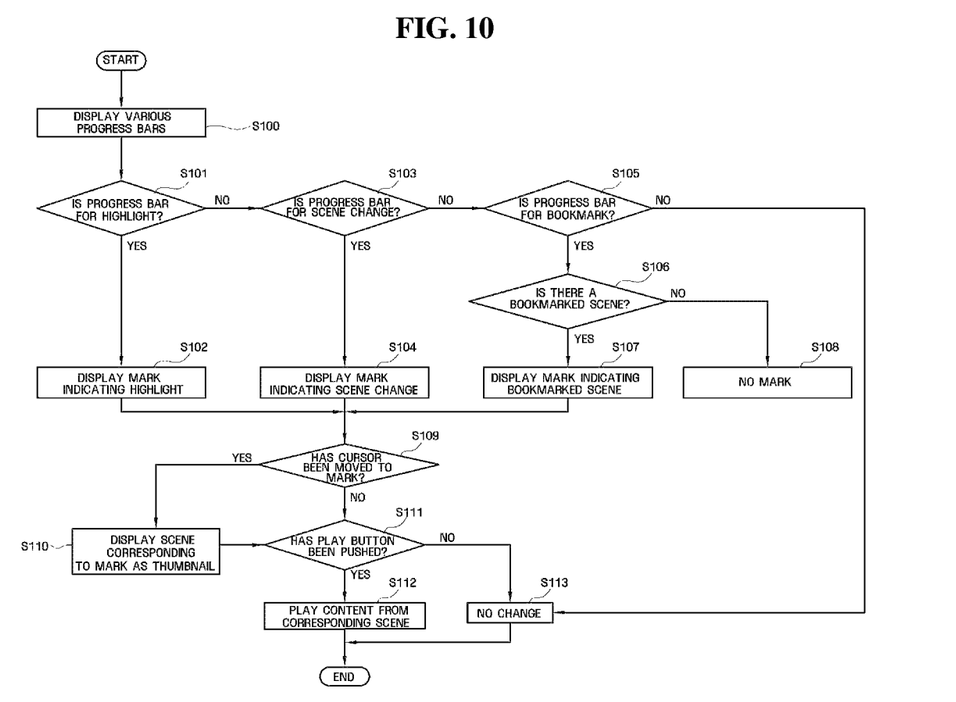
FIG. 10 is a flowchart illustrating the method of controlling an image display apparatus according to an embodiment of the invention.

FIGS. 4 to 9 are diagrams sequentially showing still pictures of a moving picture displayed by the method of controlling the image display apparatus according to an exemplary embodiment, and FIG. 10 is a flowchart illustrating the method of controlling the image display apparatus according to an exemplary embodiment.

Figure 4:
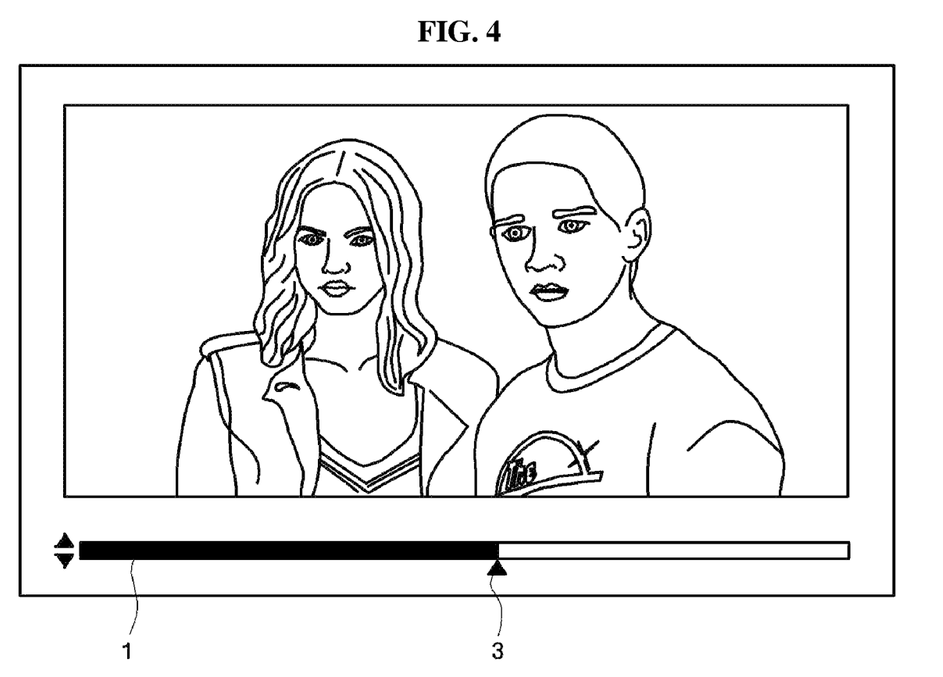
FIGS. 4 to 9 are diagrams sequentially showing illustration of scenes of a moving picture displayed by a method of controlling an image display apparatus according to an exemplary embodiment of the invention.

As shown in FIG. 4, when content that the user wants to view is played, the progress bar 1 indicating the progress time and the positional information of the content being currently played is displayed below the screen on which the content is played.

Figure 5:
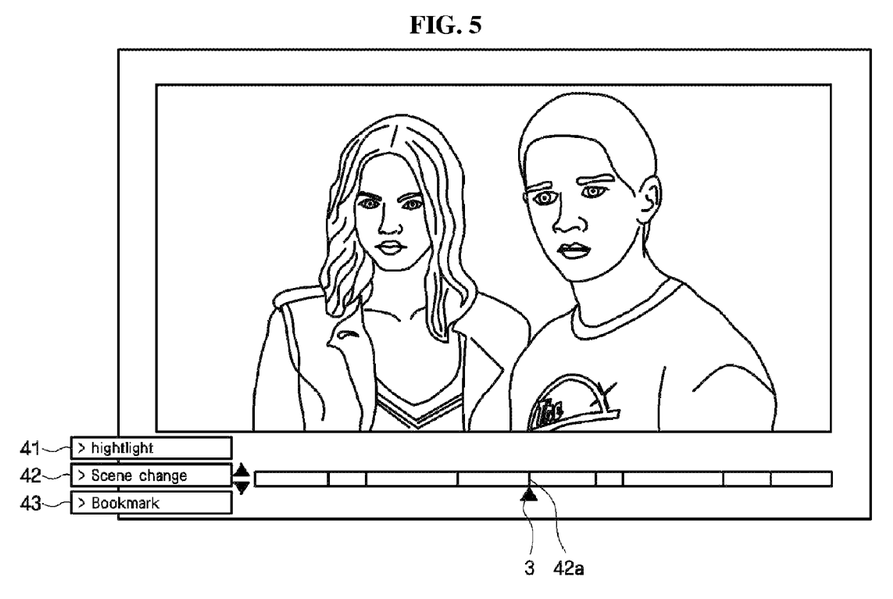

As shown in FIG. 5, when the user who views the content wants to search for a specific scene from the content, the user uses up and down arrow keys of the selecting unit 10 to select a desired progress bar 41, 42, and 43 (S100). In an exemplary embodiment when the user wants to search for highlights from the content reproduced on a TV screen, the user uses the up and down arrow keys of a TV remote controller to select the first progress bar 41 including the mark 41a indicating the highlight of the content. In addition, when the user wants to search for a rapid scene change from the content, the user selects the second progress bar 42 including the mark 42a indicating the rapid scene change. When the user wants to search for a bookmarked scene of the content, the user selects the third progress bar 43 including the mark 43a indicating the bookmarked scene.

In the method according to an exemplary embodiment, the up and down arrow keys of a remote controller of the image display apparatus, such as a TV, are used to select various progress bars 41, 42, and 43, but the invention is not limited thereto. In the image display apparatuses, such as a PMP and a PC, navigation keys or keyboard arrow keys may be used to select various progress bars.

The progress bars 41, 42, and 43, including the marks 41a, 42a, and 43a, for helping the user search for predetermined scenes according to the kinds of progress bars 41, 42, and 43, are displayed on the screen. For example, when the user selects the first progress bar 41 (S101), the mark 41a for helping the user to search for a highlight of the content is displayed on the first progress bar 41 (S102). In addition, when the second progress bar 42 is selected (S103), the mark 42a for helping the user search for a rapid scene change of the content is displayed on the second progress bar 42 (S104). When the third progress bar 43 is selected (S105), it is determined whether the user has bookmarked scenes of the content (S106). When it is determined that the scenes have been bookmarked, the mark 43a for helping the user search for the bookmarked scene is displayed on the third progress bar 43 (S107). When it is determined that no scene has been bookmarked, no mark is displayed on the third progress bar 43 (S108). A plurality of marks 41a, 42a, and 43a, are arranged at predetermined intervals on the progress bars 41, 42, and 43, respectively, and the positions of the marks depend on the kinds of progress bars 41, 42, and 43.

Figure 6:
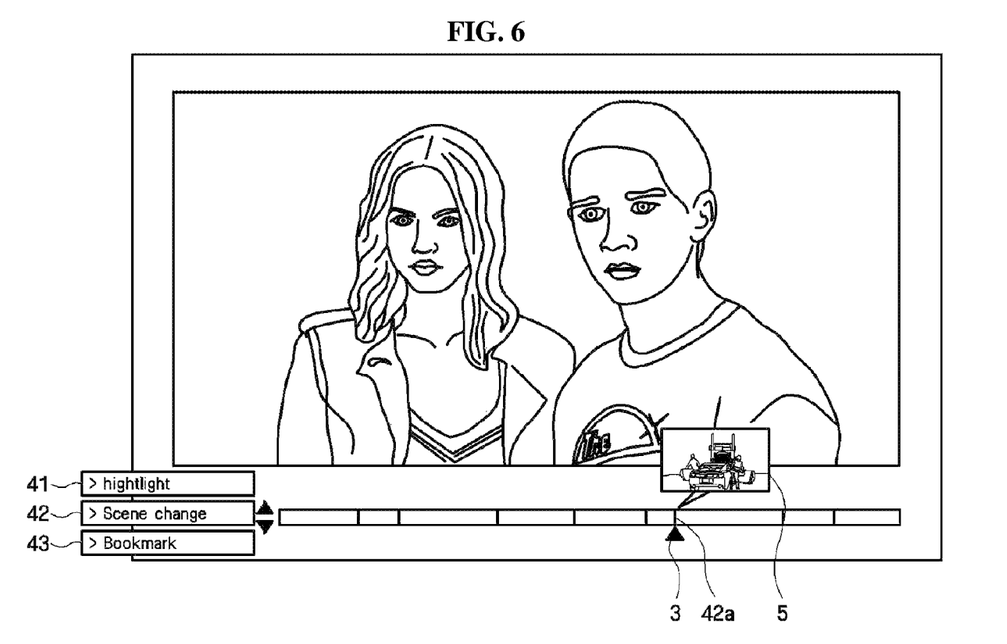

Then, the user pushes the right or left arrow key of the remote controller to move the cursor 3 to the marks 41a, 42a, and 43a on the selected progress bars 41, 42, and 43 (S109). As shown in FIG. 6, when the cursor 3 is positioned at the marks 41a, 42a, and 43a scenes corresponding to the marks 41a, 42a, and 43a are displayed as thumbnails 5 on the progress bars 41, 42, and 43 respectively, (S110).

Figure 7:
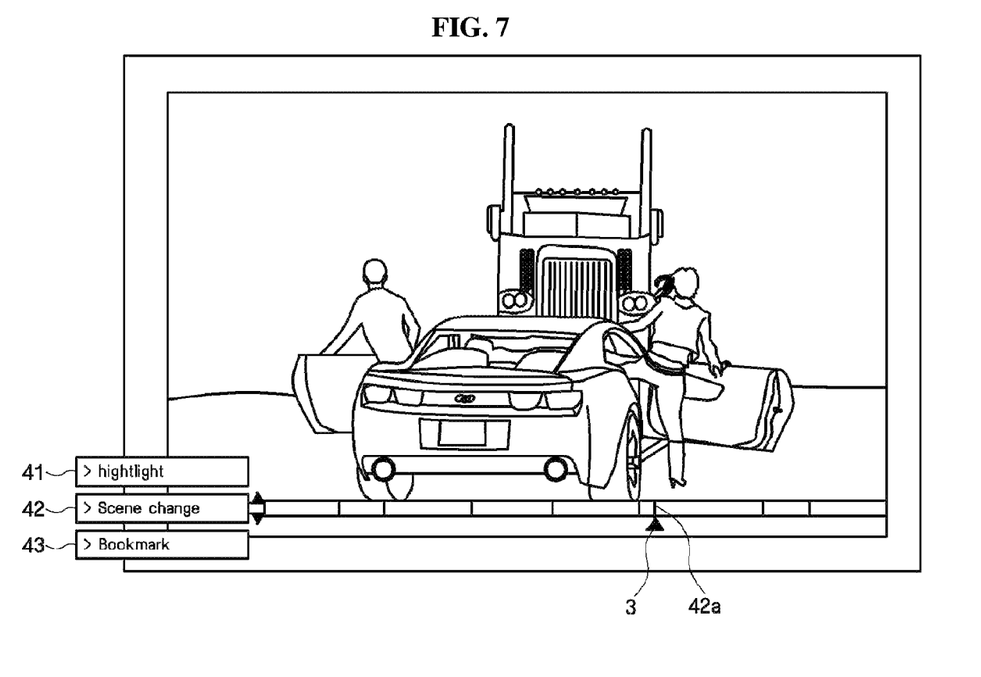

As shown in FIG. 7, when the user moves the cursor 3 to one of the marks 41a, 42a, and 43a corresponding to the scene that the user wants to view and pushes a play button (S111), the content is played from the scene (S112). When the play button is not pushed, there is no change in scene (S113).

As shown in FIG. 8, when the user uses the up and down arrow keys of the remote controller to change the progress bars 41, 42, 43, . . . , the marks are displayed on the selected progress bar. In an exemplary embodiment, when the second or third progress bar 42 or 43 is changed to the first progress bar 41, the mark 41a for helping the user search for a highlight of the content is displayed on the first progress bar 41. A method of moving the cursor 3 to the mark 41a on the first progress bar 41 to search and play the scene is the same as that described with reference to FIGS. 5 to 7, and thus a description thereof will be omitted.

Meanwhile, the kinds of progress bar 41, 42, and 43, may be added or removed at the request of the user. Specifically, as shown in FIG. 9, on a screen for selecting the progress bars 41, 42, and 43, the user can select and remove the progress bars 41, 42, and 43, including the marks indicating highlights, rapid scene changes, and bookmarks, or can add new progress bars, such as Actor1, Actor2, Actor3, and Actor4 (44, 45, 46, and 47). In an exemplary embodiment, in addition to the progress bars 41, 42, and 43, including the marks indicating the highlight, the scene change, and the bookmark, progress bars corresponding to the characters may be made, or progress bars useful for searching scenes may be added with the development of technology. A general DCM technique can be used to add or remove the kinds of progress bars.

The invention can be applied to progress bars of many types of image display apparatuses using PVRs having recording and reproducing functions.

The image display apparatus and the method of controlling the same according to the above-described exemplary embodiments produces the following effects.

Various progress bars including marks for helping the user search for predetermined scenes are provided. Therefore, the user can easily and conveniently search for a desired scene.

It is possible to easily skim through content by moving a cursor on a progress bar along marks.

It is possible to easily add or remove progress bars useful for searching for scenes with the development of technology.

What is claimed is:

1. An image display apparatus having recording and reproducing functions comprising at least one processor for implementing:
    a selecting unit which receives instructions for selecting a progress bar from a plurality of progress bars, wherein each progress bar of the plurality of progress bars represents a different kind of information of an identical section of multimedia moving picture content and includes a plurality of marks for searching for a plurality of predetermined scenes of multimedia moving picture content;
    a storage unit which stores information concerning each progress bar of the plurality of progress bars, and stores information concerning the plurality of marks for searching for the plurality of predetermined scenes of content; and
    a control unit which extracts a scene corresponding to a mark of the progress bar from the storage unit, and displays the scene,
    wherein the storage unit stores information of the plurality of progress bars which include a default progress bar indicating a progress time and a position information of content being currently reproduced and a plurality of additional progress bars of which a kind, a shape, and an operation method depend on a characteristic of the image display apparatus,
    wherein the plurality of progress bars are provided at a request of a user, and
    wherein the plurality of progress bars comprises at least one of a first progress bar comprising a mark indicating a highlight of the content, a second progress bar comprising a mark indicating a rapid scene change, and a third progress bar comprising a mark indicating a scene that is bookmarked by a user.

2. The image display apparatus of claim 1, wherein a plurality of positions of the plurality of marks depend on a type of the progress bar.

3. The image display apparatus of claim 1, wherein the plurality of marks are arranged at predetermined intervals on the progress bar.

4. The image display apparatus of claim 1, wherein the control unit comprises:
    a first controller which controls an operation of a first additional progress bar comprising a mark indicating a highlight of the multimedia moving picture content;
    a second controller which controls an operation of a second additional progress bar comprising a mark indicating a rapid scene change; and
    a third controller which controls an operation of a third additional progress bar comprising a mark indicating a scene bookmarked by a user.

5. The image display apparatus of claim 1, wherein, if a cursor is positioned at the mark on the selected progress bar, the control unit displays a scene corresponding to the mark as a thumbnail image.

6. The image display apparatus of claim 1, wherein the selecting unit comprises at least one of arrow keys of a remote controller and a keyboard.

7. The image display apparatus of claim 1, further comprising:
    a setting unit which adds or removes the progress bar at a request of a user.

8. A method of controlling an image display apparatus having recording and reproducing functions, comprising:
    selecting a progress bar from a plurality of progress bars, wherein each progress bar of the plurality of progress bars represents a different kind of information of an identical section of multimedia moving picture content and includes a plurality of marks for searching for a plurality of predetermined scenes of the multimedia moving picture content;
    displaying the plurality of marks for searching for the plurality of predetermined scenes of the content, on the selected progress bar;
    moving a cursor to a mark on the selected progress bar; and
    reproducing a scene corresponding to the mark when a user pushes a play button with the cursor positioned at the mark,
    wherein the plurality of progress bars which include a default progress bar indicating a progress time and a position information of content being currently reproduced and a plurality of additional progress bars of which a kind, a shape, and an operation method depend on a characteristic of the image display apparatus are stored in a storage unit,
    wherein the selecting the progress bar comprises selecting at least one of a first progress bar including a mark indicating a highlight of the content, a second progress bar including a mark indicating a rapid scene change, and a third progress bar including a mark indicating a scene that is bookmarked by the user.

9. The method of claim 8, wherein the selecting the progress bar comprises using at least one of arrow keys of a remote controller and a keyboard to select the progress bars.

10. The method of claim 8, further comprises displaying a plurality of marks indicating highlights on a first additional progress bar for searching for highlights of the multimedia moving picture content, if the first additional progress bar is selected.

11. The method of claim 8, further comprises displaying a plurality of marks indicating rapid scene changes on a second additional progress bar for searching for rapid scene changes in the content, if the second additional progress bar is selected.

12. The method of claim 8, further comprises displaying a plurality of marks indicating bookmarked scenes on a third additional progress bar for searching for bookmarked scenes, if the third additional progress bar is selected.

13. The method of claim 8, further comprising:
displaying the scene corresponding to the mark as a thumbnail image if the cursor is positioned at the mark.

14. The method of claim 13, further comprising:
adding or removing the selected progress bar at a request of the user.

* * * * *